(12) United States Patent
Walter et al.

(10) Patent No.: US 9,765,735 B2
(45) Date of Patent: Sep. 19, 2017

(54) LIQUID TRAP WITH INTEGRAL JET PUMP

(71) Applicant: Eaton Corporation, Cleveland, OH (US)

(72) Inventors: Stefan Walter, Karlsruhe (DE); Subrata Sarkar, Maharashtra (IN); Swethaghnya Kusa, Maharashtra (IN); Prakash Kotagond, Maharashtra (IN); Himanshu Joshi, Maharashtra (IN); Pritam Bhurke, Maharashtra (IN); Vaughn Mills, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 213 days.

(21) Appl. No.: 14/708,723

(22) Filed: May 11, 2015

(65) Prior Publication Data

US 2015/0240764 A1 Aug. 27, 2015

Related U.S. Application Data

(63) Continuation of application No. 13/334,529, filed on Dec. 22, 2011, now Pat. No. 9,045,038.

(51) Int. Cl.
*F02M 37/02* (2006.01)
*B60K 15/035* (2006.01)
*F04F 5/02* (2006.01)

(52) U.S. Cl.
CPC ..... *F02M 37/025* (2013.01); *B60K 15/03504* (2013.01); *B60K 15/03519* (2013.01); *F04F 5/02* (2013.01); *B60K 2015/03509* (2013.01); *Y10T 137/86075* (2015.04)

(58) Field of Classification Search
CPC ... F02M 37/025; F04F 5/02; B60K 15/03504; B60K 15/03519; B60K 2015/03509; Y10T 137/86075
See application file for complete search history.

(56) References Cited

U.S. PATENT DOCUMENTS

| | | | | |
|---|---|---|---|---|
| 3,349,790 A | * | 10/1967 | Engstrom | A61M 16/208 137/247.17 |
| 4,762,156 A | * | 8/1988 | Rich | F02M 25/0836 141/286 |
| 6,182,693 B1 | * | 2/2001 | Stack | B01D 53/0415 123/519 |

(Continued)

FOREIGN PATENT DOCUMENTS

| | | |
|---|---|---|
| CN | 1774351 A | 5/2006 |
| CN | 101315053 A | 12/2008 |

(Continued)

OTHER PUBLICATIONS http://www.eaton.com/Eaton/ProductsServices/Vehicle/Fuel-Emissions-Control/fuel-vapor-vales/index.htm#tabs-1-3; Jun. 22, 2015.

*Primary Examiner* — Joseph Dallo
(74) *Attorney, Agent, or Firm* — Quinn IP Law

(57) ABSTRACT

An assembly is provided that integrates a jet pump with a liquid trap to drain liquid fuel from vapor flow, such as vapor vented from a fuel tank. The assembly includes a housing that has a liquid trap configured to trap liquid carried in vapor flowing through the housing. A jet pump has a venturi nozzle and is in selective fluid communication with the liquid trap so that liquid flow through the venturi nozzle induces draining of the liquid trap.

21 Claims, 4 Drawing Sheets

(56) References Cited

U.S. PATENT DOCUMENTS

| | | | |
|---|---|---|---|
| 8,347,691 B2 | 1/2013 | Makino et al. | |
| 9,200,600 B1 * | 12/2015 | Taylor | F02M 25/08 |
| 2003/0205272 A1 | 11/2003 | Benjey et al. | |

FOREIGN PATENT DOCUMENTS

| | | |
|---|---|---|
| CN | 102186692 A | 9/2011 |
| CN | 203067129 U | 7/2013 |
| JP | 2010265860 A | 11/2010 |

* cited by examiner

LIQUID TRAP WITH INTEGRAL JET PUMP

CROSS-REFERENCE TO RELATED APPLICATION

This application is a continuation application of and claims priority to U.S. patent application Ser. No. 13/334,529, filed Dec. 22, 2011, which is hereby incorporated by reference in its entirety.

TECHNICAL FIELD

The present teachings generally include a liquid trap drainable via a jet pump.

BACKGROUND

Fuel tank vapor and emission control systems can be used to control the flow of fuel vapors from a vehicle fuel tank and also to control the relative pressure of the fuel tank. Vapors may be vented to a canister or other similar vapor recovery control structure and stored until provided to an engine.

SUMMARY

An assembly is provided that integrates a jet pump with a liquid trap to drain liquid fuel from vapor flow, such as vapor vented from a fuel tank. The assembly includes a housing that has a liquid trap configured to trap liquid carried in vapor flowing into the housing. A jet pump has a venturi nozzle and is in selective fluid communication with the liquid trap so that liquid flow through the venturi nozzle induces draining of the liquid trap.

A valve can be included in the housing. The valve is configured to prevent draining of the liquid trap by the jet pump when a pressure differential created by liquid flow through the venturi nozzle is below a predetermined level, and to allow fluid communication between the jet pump and the liquid trap when the pressure differential is above the predetermined level. The valve allows draining of the liquid trap to the jet pump through an opening in the housing while preventing liquid fuel from entering the trap through the opening.

A pressure reducer can be upstream of the venturi nozzle. The pressure reducer is configured to reduce pressure and increase velocity of liquid flow to the venturi nozzle. The pressure reducer can include a series of plugs positioned to define a tortuous flow path for liquid flow to the venturi nozzle, thereby reducing pressure and increasing velocity of the liquid flow.

The above features and advantages and other features and advantages of the present teachings are readily apparent from the following detailed description of the best modes for carrying out the present teachings when taken in connection with the accompanying drawings.

DETAILED DESCRIPTION

Figure 1:
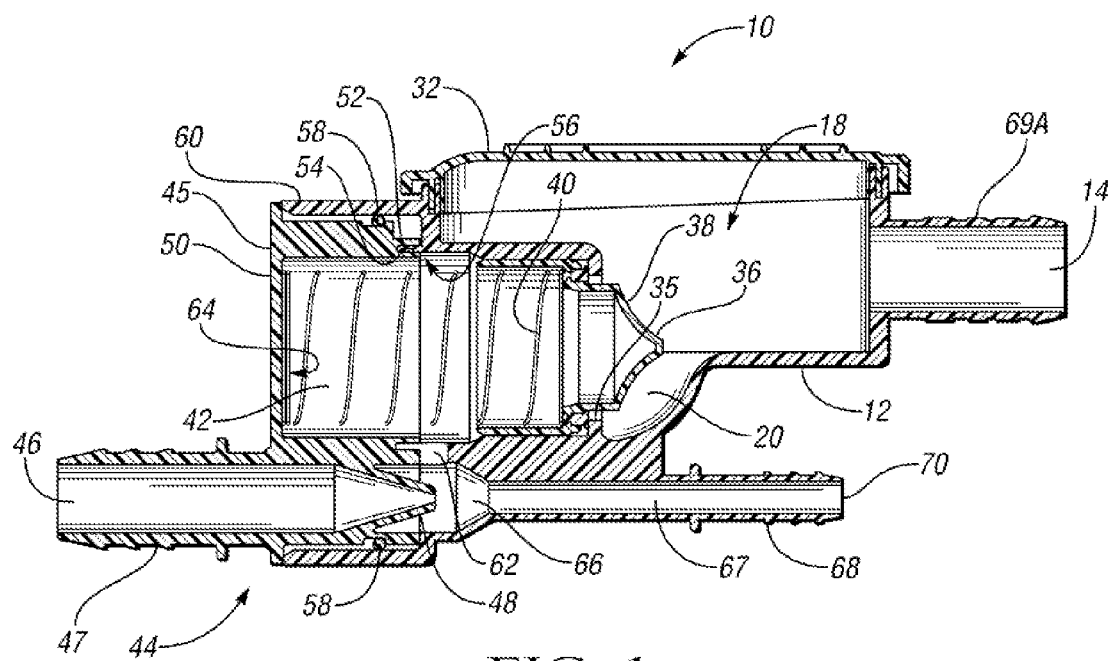
FIG. 1 is a schematic illustration in cross-sectional view of a liquid trap assembly with a liquid trap and an integrated jet pump, taken at the lines 1-1 in FIG. 2.

Referring to the drawings, wherein like reference numbers refer to like components throughout the several views, FIG. 1 shows a liquid trap assembly 10 that efficiently drains liquid collected from vapor. The liquid trap assembly 10 has a housing 12. The housing 12 has a first port, referred to as a vapor flow inlet 14 and a second port, referred to as a vapor flow outlet 16 (shown in FIG. 2) in fluid communication with an interior cavity 18 formed at least in part by the housing 12. Vapor flows from the vapor flow inlet 14, through the cavity 18, to the vapor flow outlet 16. Liquid entrained in the vapor flow is collected in a liquid trap 20 formed by the housing 12 at the bottom of the housing 12. The outlet 16 can be replaced by an outlet valve, or the housing 12 can have no outlet. Either or both of the housing 12 and a cap 32 described below (in embodiments that have a cap 32) can have features that promote separation of liquid and vapor, such as baffles and ribs.

The liquid trap assembly 10 may be used in many applications. In one application described herein, the liquid trap assembly 10 is used in a fuel vapor recovery system 21 on a vehicle, shown schematically in FIG. 8. The vehicle can be a diesel, gasoline, or hybrid application. Vapor is vented from a fuel tank 22 containing liquid fuel through a vapor vent valve 26 that may provide pressure relief, rollover shutoff, and other functions. Vapor flows from the vapor vent valve 26 to the liquid trap assembly 10 through inlet 14 and exits through an outlet 16 to a vapor recovery device, such as a canister 28 filled with carbon granules. The canister 28 is periodically purged to an engine 30. The liquid trap assembly 10 is shown mounted within the fuel tank 22. Alternatively, the liquid trap assembly 10 can be external to the fuel tank 22.

Figure 2:
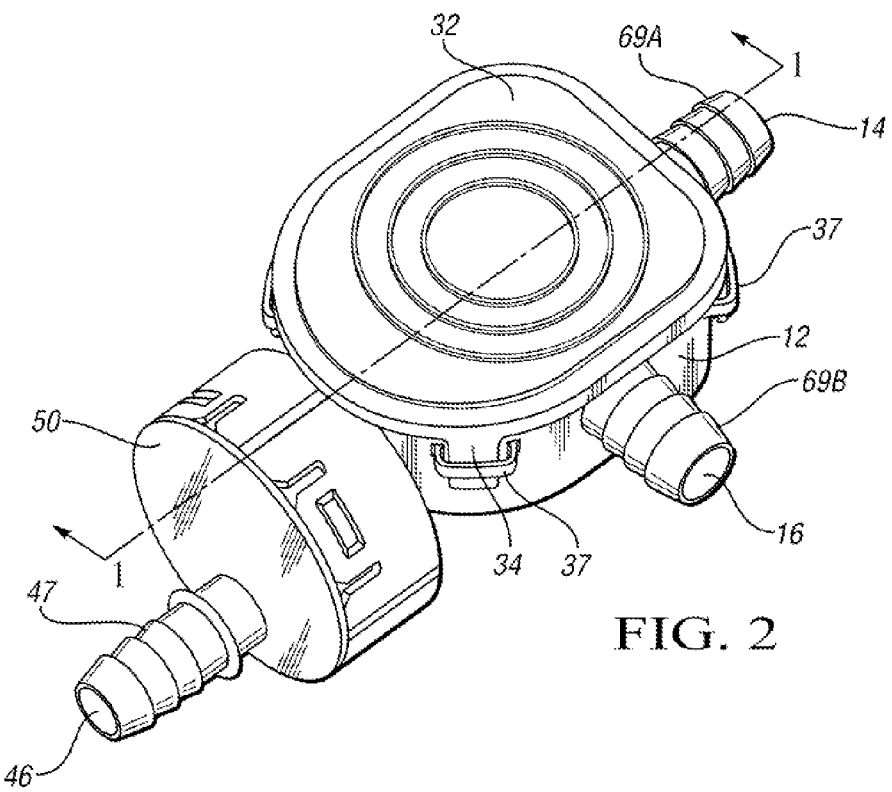
FIG. 2 is a schematic perspective illustration of the liquid trap assembly assembly of FIG. 1.
Figure 3:
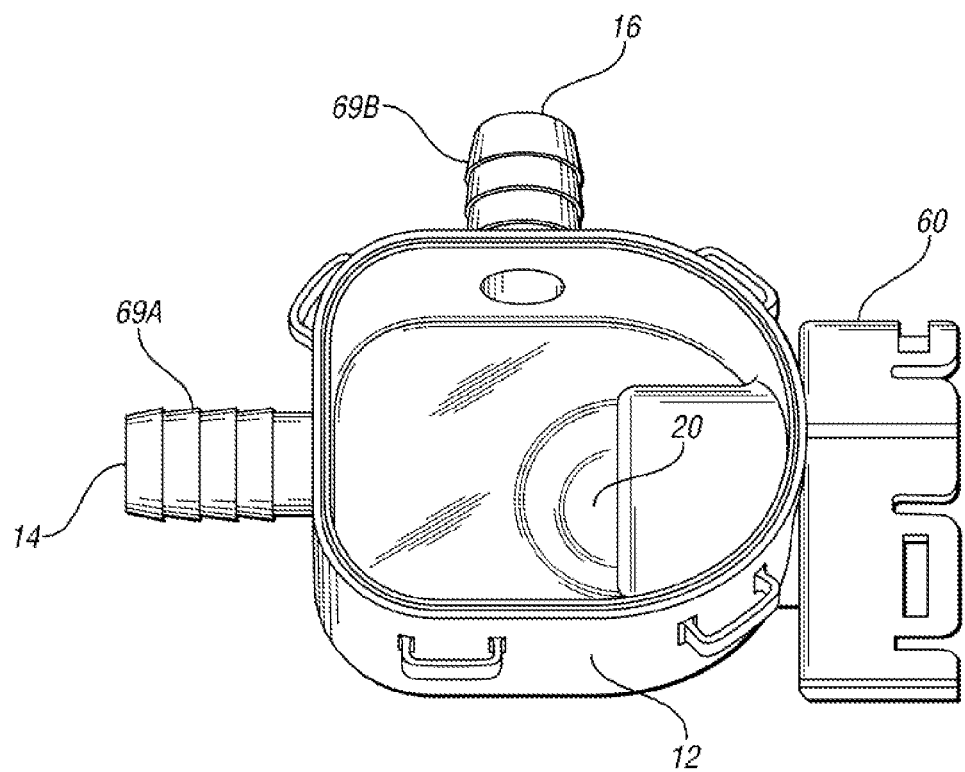
FIG. 3 is a schematic perspective top view illustration of the liquid trap assembly of FIG. 1 with a cap removed.
Figure 4:
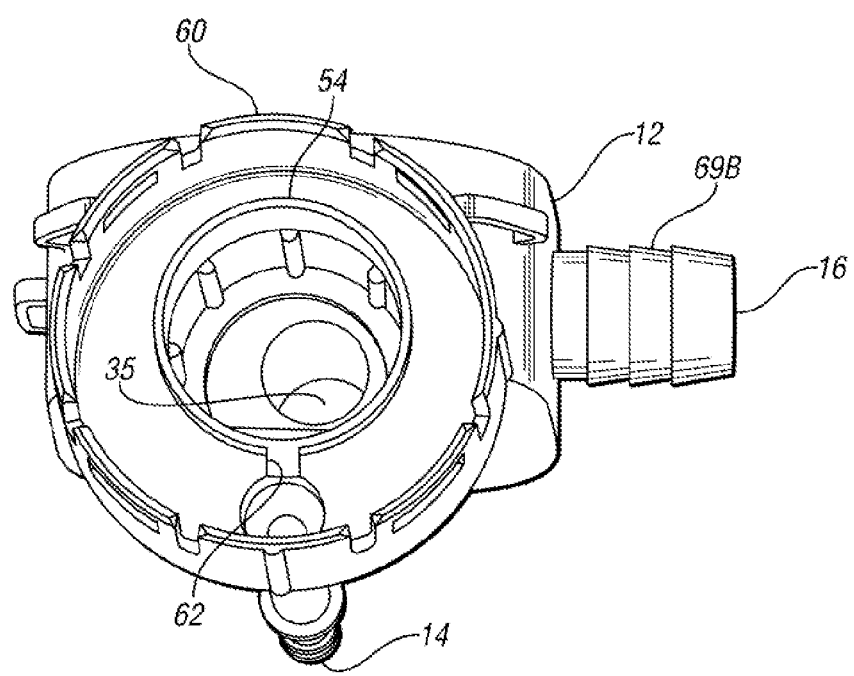
FIG. 4 is a schematic perspective side view illustration of the liquid trap assembly of FIG. 1.

FIG. 2 shows a cap 32 that closes a top portion of the cavity 18 of FIG. 1 by connecting to the housing 12 with tabs 34 of the cap 32 held at retainers 37 of the housing 12. The housing 12 can instead be a one-piece component without a separate cap 32. The housing 12 forms a first opening 35 in a sidewall adjacent to the liquid trap 20. The opening 35 is selectively closed by a check valve 36. Any type of valve can be used to close the opening 35, or there can be no valve at the opening 35. The opening 35 is best shown in FIG. 4, in which the check valve 36 of FIG. 1 is removed. The check valve 36 includes a valve body 38 and a spring 40 that biases the valve body 38 into the first opening 35 to close the opening 35 and separate the cavity 18 and liquid trap 20 from a valve cavity 42 in which the spring 40 and valve body 38 are movable, as described herein. When the check valve 36 closes the opening 35, it also prevents liquid from entering the liquid trap 20 through the opening 35. The valve body 38 is generally annular and has a generally-cone-shaped end that extends into the chamber 18. The spring 40 has a diameter that fits inside the generally annular valve body 38. A valve body with a different shape can also be used. For example, a ball valve may be used to close the opening 35.

The liquid trap assembly 10 includes a jet pump 44. A first component 45 of the jet pump 44 includes an inlet portion 47 forming a passage with an inlet 46, a venturi nozzle 48 and an end plate 50 integrally formed with one another. An interface of a groove 52 at an end of the first component 45 and an extension 54 of the housing 12 forms a labyrinth seal 56 that substantially prevents liquid and vapor from passing out of the valve cavity 42, except for through a second opening 62, as described below. The extension 54 is also shown in FIG. 4. Another annular seal 58 between the first component 45 and a flange 60 of the housing 12 further prevents liquid and vapor from escaping the housing 12. Although a labyrinth seal 56 and an annular seal 58 are shown, other types of seals can instead be used. In lieu of seals, the first component 45 can be welded or otherwise connected to the housing 12. A second opening 62 at a lower portion of the housing 12 forms a gap in the labyrinth seal 56 adjacent the nozzle 48. The first component 45 of the jet pump 44 connected to the housing 12 closes the valve cavity 42 and provides a surface 64 on which the spring 40 rests. The only exit from the valve cavity 42 is the opening 62.

A lower portion of the housing 12 forms a portion of a jet pump 44, as described below, including a cavity 66 around the nozzle 48 that is also in fluid communication with the opening 62. The housing 12 also forms an outlet portion 68 of the jet pump 44, with a channel 67 between the cavity 66 and an outlet 70. The channel 67 of the outlet portion 68 can be designed to function as a diffuser to increase pressure and reduce velocity of the fluid. Instead of the housing 12 forming a channel 67 that functions as a diffuser, a tube configured to function as a diffuser can be connected to receive flow from the cavity 66. The cavity 66 and channel 67 serve as a mixing chamber at the outlet of the nozzle 48.

Figure 8:
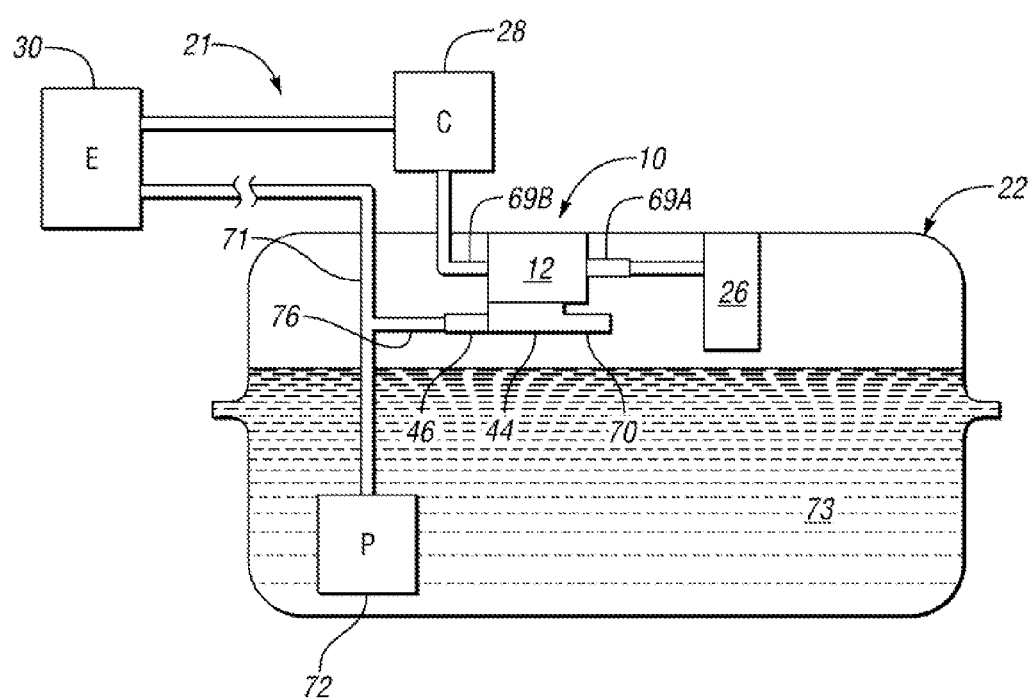
FIG. 8 is a schematic illustration of a vehicle fuel system including the liquid trap assembly of FIG. 1.

The vapor flow inlet 14, the second port 16, the inlet 46 and the outlet 70 are formed by barbed connectors 69A, 69B, respectively, so that connection to other components of the fuel vapor system 21 of FIG. 8 is simplified. For example, the barbed connector 69A forming inlet 14 is connected to vapor tubing in communication with the vapor vent valve 26. The barbed connector 69B forming the outlet 16 is connected to the canister 28 via tubing to serve as a vapor outlet. Other types of connectors or structure for making connections, such as quick-connect ports, can be used instead of barbed connectors. The inlet 46 of the jet pump 44 is connected by tubing 76 to a fuel pump 72 submerged in the liquid fuel 73. The fuel pump 72 is also connected to the engine 30 via fuel discharge tubing 71. Fuel is discharged from the fuel pump 72 at relatively high pressure through the fuel discharge tubing 71. The tubing 76 branches from the fuel discharge tubing 71, providing relatively high pressure liquid fuel flow to the inlet portion 46.

Referring again to FIG. 1, fluid flowing out of the nozzle 48 creates a vacuum or at least a relatively low pressure area in the cavity 66 adjacent the opening 62. Pressure is also reduced in the cavity 42 due to the vacuum or low pressure in the cavity 66, creating a pressure differential across the valve body 36, as pressure in the cavity 42 is lower than pressure in the cavity 18. When the pressure differential reaches a predetermined level such that a force is created by the pressure differential on the area of the valve body 38 exposed to the cavity 18, and the force is greater than the force keeping the check valve 36 shut, in this case the force of the spring 40, the valve body 38 will move toward the surface 64 of the end plate 50, compressing the spring 40 and establishing fluid communication between the liquid trap 20 and the opening 62. The jet pump 44 is a fuel discharge assembly which has the propelling mechanism, due to the pressure differential and jet action, to discharge liquid fuel in the trap 20 to the fuel tank 22.

The jet pump 44 utilizes high pressure fluid from the fuel pump 72 which flows through the nozzle 48 with a high velocity. The flow through the nozzle 48 is referred to as the primary flow or primary stream. The high velocity fluid leaving the nozzle 48 creates a low pressure or a vacuum in the area adjacent the nozzle 48, such as at the opening 62. The pressure differential between the high pressure fluid exiting the nozzle 48 and the portion of the cavity 66 adjacent the nozzle 48 induces flow, such as through the opening 62, referred to as an induced stream or secondary flow. The pressure of the liquid increases as the flow travels through the cavity 66. In some embodiments of the jet pump 44, the outlet portion 68 with channel 67 is designed to function as a diffuser to increase pressure and reduce velocity of the fluid. Many factors affect the performance and efficiency of the jet pump 44, including fluid molecular weight, feed temperature, position of the nozzle 48, throat dimension, motive velocity, Reynolds number, pressure ratio, specific heat ratio, and the angle between the motive and induced stream.

Figure 5:
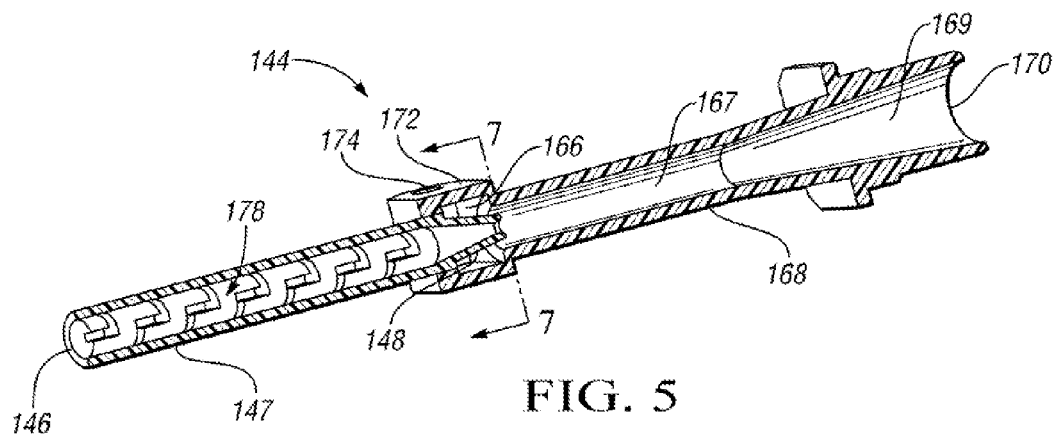
FIG. 5 is a schematic illustration in cross-sectional view of an alternative embodiment of a jet pump for the liquid trap assembly of FIG. 1, taken at lines 5-5 in FIG. 7.
Figure 7:
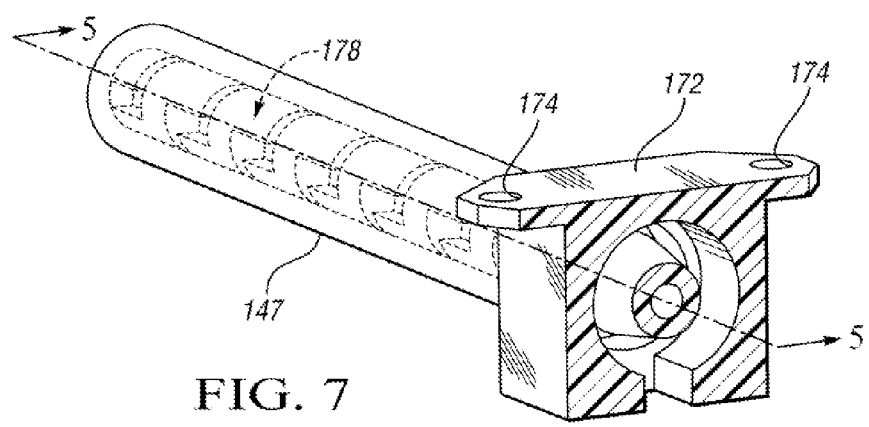
FIG. 7 is a schematic perspective cross-sectional view of the jet pump of FIGS. 5 and 6, taken at lines 7-7 of FIG. 5.

FIG. 5 shows another embodiment of a jet pump 144 that can be used in place of the jet pump 44 in FIG. 1. The jet pump 144 has a mounting interface 172 at which it is designed to be fastened to the housing 12. Accordingly, in this embodiment, the end plate 50 of FIG. 1 would be a separate component from the jet pump 144, and the end plate 50 would be modified to include a fastener opening aligning with fastener openings 174 of the jet pump 144 shown in FIG. 7. Alternatively, the jet pump 144 could be made integral with the housing 12 and end plate 50.

Figure 6:
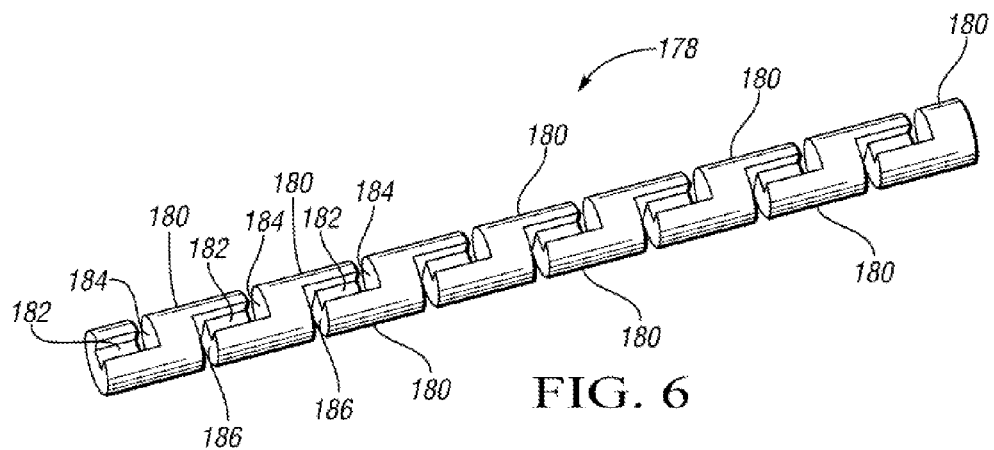
FIG. 6 is a schematic illustration in perspective view of plugs forming a pressure reducer in the jet pump of FIG. 5.

The jet pump 144 has a pressure reducer 178 located in a passage formed by an inlet portion 147, downstream of the inlet 146 and upstream of the nozzle 148. The pressure reducer 178 can instead be located further upstream of the jet pump 144 such as in a vent line leading to the jet pump 144. The pressure reducer 178 reduces pressure and volume flow rate of fluid flow from the inlet 146 to the nozzle 148, while increasing velocity of flow through the nozzle 148. The pressure reducer 178 can be a series of plugs 180 within the inlet portion 147. The plugs 180 are generally cylindrical in the embodiment shown, but can have other cross-sectional shapes. Each plug 180 has an axial opening 182 and a sector opening 184 in fluid communication with one another. The underside of each plug 180 in FIG. 6 has another axial opening (not shown) in fluid communication with a gap 186 between the plug 180 and the next upstream plug 180. The gap 186 is then in fluid communication with axial opening 182 and the sector opening 184 of the upstream plug 180. In this manner, a tortuous flow path is established by the pressure reducer 178 in the inlet portion 147 by requiring fluid to flow in alternate directions through the axial openings 182 to the sector openings 184 of each plug 180 in order to reach the nozzle 148. The tortuous flow path proceeds axially through an axial opening 182, then clockwise along a portion of a circle through the sector opening 184, then axially again through an axial opening 182 on an underside of the plug 180, then perpendicularly to the axial opening 182 of the next plug 180, to the next sector opening 184, etc. A jet pump 144 with a pressure reducer 178 increases the draining rate of the liquid trap 20 of FIG. 1 by increasing jet action.

Referring again to FIG. 5, an outlet portion 168 of the jet pump 144 has a channel 167 between a cavity 166 and an outlet 170. The cavity 166 is adjacent the nozzle 148. The channel 167 of the outlet portion 168 can be designed to function as a diffuser to increase pressure and reduce velocity of the fluid. The channel 167 serves as a mixing chamber at the outlet of the nozzle 148. The channel 167 flares outward in the direction of flow at a distal portion 169 to function as a diffuser, further reducing velocity and pressure of the fluid.

By utilizing the jet pump 144, a higher draining capacity of the liquid trap 20 of FIG. 1 can result, as a greater pressure reduction with higher jet action is achieved. Further, the pressure reducer 178 and the diffuser formed by the distal portion 169 help to reduce the likelihood of cavitation in the fluid by reducing pressure. Because flow rate is reduced by the pressure reducer 178, the opening at the tip of the nozzle 148 can be larger while still achieving a desired flow velocity and pressure differential. A larger diameter nozzle tip helps to avoid blockage in the flow.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An assembly comprising:
   a housing having a liquid trap configured to trap liquid carried in vapor flow into an interior cavity of the housing; wherein the housing has a first opening through which the liquid trap drains;
   a valve configured to be selectively movable between a closed position and an open position; wherein the valve closes the first opening to prevent draining of the liquid trap through the first opening when the valve is in the closed position, and allows draining of the liquid trap through the first opening when the valve is in the open position;
   wherein the valve includes:
      a valve body with a generally cone-shaped end that extends into the interior cavity; and
      a spring that biases the valve body to the closed position.

2. The assembly of claim 1, wherein the valve prevents vapor from passing from the interior cavity through the first opening when the valve is in the closed position, and allows vapor to pass from the interior cavity through the first opening when the valve is in the open position.

3. The assembly of claim 1, wherein the valve body is generally annular, and the spring has a diameter that fits inside of the generally annular valve body.

4. The assembly of claim 3, wherein the spring is positioned in a valve cavity and the housing forms a second opening exposed to the valve cavity; and wherein liquid draining from the liquid trap through the first opening exits the valve cavity through the second opening.

5. The assembly of claim 4, wherein the cone-shaped end of the valve body is exposed to a pressure differential between a pressure in the interior cavity and a pressure in the valve cavity; and
   wherein the valve moves to the open position when a force on an area of the cone-shaped end caused by the pressure differential is greater than a force of the spring.

6. The assembly of claim 1, wherein the first opening is in a sidewall of the housing adjacent the liquid trap.

7. The assembly of claim 1, further comprising:
   a jet pump having a venturi nozzle and in selective fluid communication with the liquid trap so that liquid flow through the venturi nozzle induces draining of the liquid trap.

8. The assembly of claim 7, wherein the housing forms a second opening; wherein the valve prevents fluid communication between the interior cavity and the second opening when the valve is in the closed position, and establishes fluid communication between the interior cavity and the second opening when the valve is in the second position; and
   wherein the jet pump is mounted to the housing with the venturi nozzle substantially adjacent the second opening.

9. The assembly of claim 8, further comprising:
   a pressure reducer upstream of the venturi nozzle and configured to reduce pressure and increase velocity of liquid flow to the venturi nozzle.

10. The assembly of claim 9, wherein the pressure reducer includes a series of plugs positioned to define a tortuous flow path for liquid flow to the venturi nozzle, thereby reducing pressure and increasing velocity of the liquid flow.

11. The assembly of claim 10, wherein the plugs are generally cylindrical and have axial and sector openings that form the tortuous flow path.

12. The assembly of claim 11, wherein the series of plugs are in an inlet portion of the jet pump so that the fluid flow proceeds axially through the axial opening of one of the plugs then through one of the sector openings of said one of the plugs, then axially through the axial opening of an adjacent one of the plugs, then through one of the sector openings of said adjacent one of the plugs.

13. The assembly of claim 7, wherein the jet pump has a mixing chamber and a diffuser downstream of the venturi nozzle.

14. A system comprising:
   a fuel tank having a fuel pump;
   an engine to which fuel is provided through a fuel discharge line from the fuel pump;
   a fuel vapor recovery device;
   a vapor vent valve operatively connected to the fuel tank and operable to communicate fuel vapor from the fuel tank to the vapor recovery device;
   a liquid trap assembly operatively connected to the fuel tank and including:
      a housing having a liquid trap configured to trap liquid carried in the fuel vapor flowing from the vapor vent valve into the housing; wherein the housing has a first opening;
      a valve configured to be selectively movable between a closed position and an open position; wherein the valve closes the first opening to prevent draining of the liquid trap through the first opening when the valve is in the closed position, and allows draining of the liquid trap through the first opening when the valve is in the open position;
      wherein the valve includes:
         a valve body with a generally cone-shaped end that extends into the interior cavity; and
         a spring that biases the valve body to the closed position.

15. The system of claim 14, wherein the valve body is generally annular, and the spring has a diameter that fits inside of the generally annular valve body.

16. The system of claim 14, wherein the spring is positioned in a valve cavity and the housing forms a second opening exposed to the valve cavity; and wherein liquid draining from the liquid trap through the first opening exits the valve cavity through the second opening.

17. The system of claim 16, wherein the cone-shaped end of the valve body is exposed to a pressure differential between a pressure in the interior cavity and a pressure in the valve cavity; and wherein the valve moves to the open position when a force on an area of the cone-shaped end caused by the pressure differential is greater than a force of the spring.

18. The system of claim 16, wherein the second opening is lower than the first opening.

19. The system of claim 14, further comprising:

a jet pump operatively connected to receive fuel from the fuel discharge line; and wherein the jet pump has a venturi nozzle and is in selective fluid communication with the liquid trap so that fuel flow through the venturi nozzle induces draining of the liquid trap through the first opening.

20. The system of claim 19, further comprising:

a pressure reducer operatively connected between the fuel pump and the venturi nozzle; and wherein the pressure reducer includes a series of plugs positioned to define a tortuous flow path for liquid fuel flow to the venturi nozzle, thereby reducing pressure and increasing velocity of the liquid fuel.

21. The system of claim 19, wherein the jet pump is at a different elevation than the fuel pump in the fuel tank.

\* \* \* \* \*